United States Patent [19]

Fabel

[11] 4,172,187

[45] Oct. 23, 1979

[54] ABRASION RESISTANT COATING COMPOSITIONS

[75] Inventor: David A. Fabel, Springfield, Mass.

[73] Assignee: Monsanto Company, St. Louis, Mo.

[21] Appl. No.: 937,638

[22] Filed: Sep. 20, 1978

Related U.S. Application Data

[62] Division of Ser. No. 840,344, Oct. 7, 1977.

[51] Int. Cl.$^2$ ............................ C08F 8/12; C08F 8/28; C08F 8/00
[52] U.S. Cl. ........................................ 525/61; 525/342
[58] Field of Search .................. 526/29, 9; 428/412, 428/447, 336, 216

[56] References Cited

U.S. PATENT DOCUMENTS

| | | | |
|---|---|---|---|
| 2,404,357 | 7/1946 | Bechtold | 428/336 |
| 2,440,711 | 5/1948 | Bechtold | 428/412 |
| 3,652,379 | 3/1972 | White et al. | 428/447 |
| 3,998,991 | 12/1976 | Kaas | 428/216 |

*Primary Examiner*—William F. Hamrock
*Attorney, Agent, or Firm*—David Bennett; William J. Farrington; Stanley M. Tarter

[57] ABSTRACT

An abrasion-resistant coating composition is disclosed which comprises a polyvinyl acetal having a hydroxyl group content, calculated as polyvinyl alcohol, of from 35 to 50 percent by weight and polysilicic acid, the weight ratio of polysilicic acid to polyvinyl acetal being from 2:1 to 4:1.

4 Claims, 1 Drawing Figure

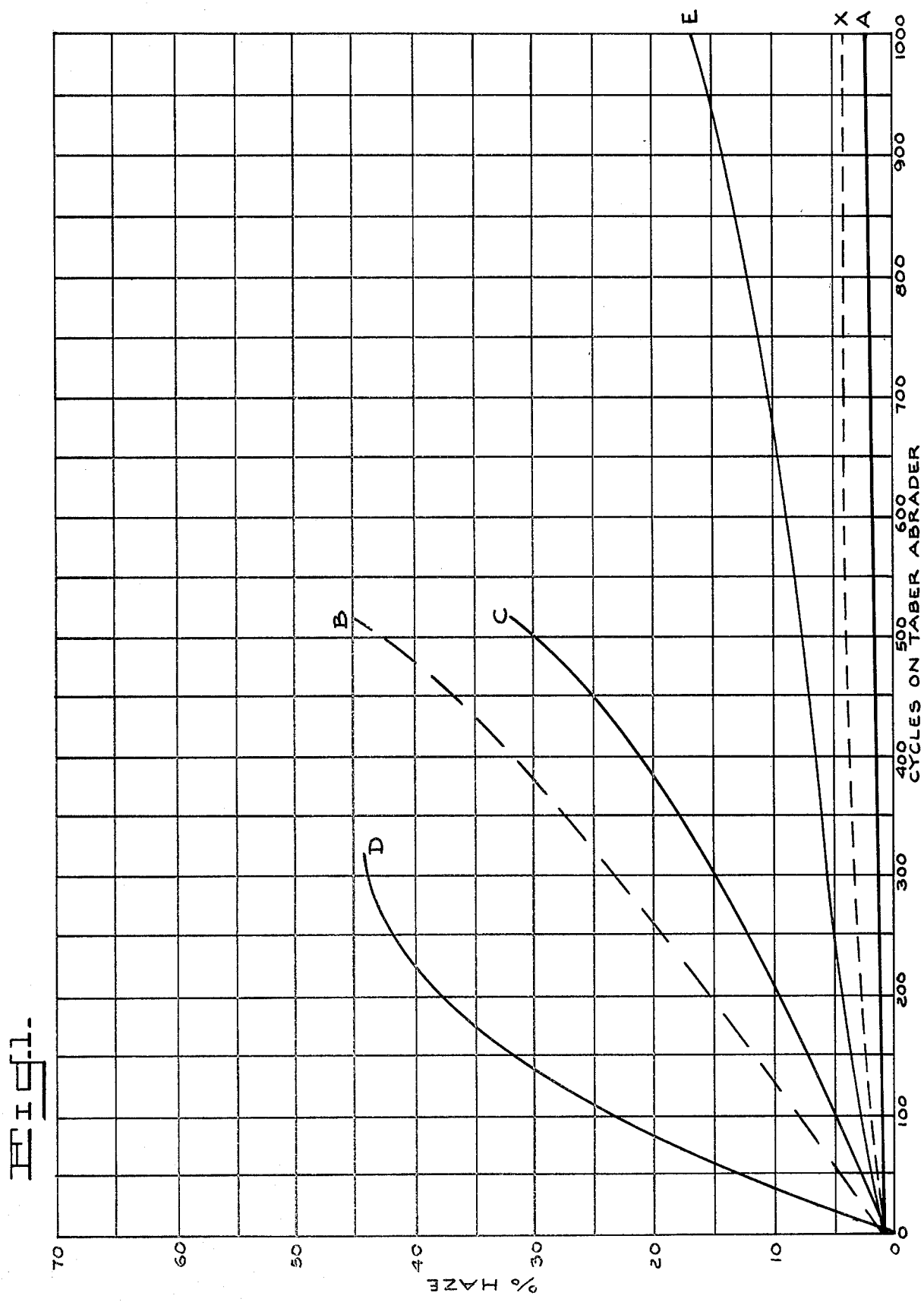

ABRASION RESISTANT COATING COMPOSITIONS

This application was divided out from Application Ser. No. 840,344, filed Oct. 7, 1977.

BACKGROUND OF THE INVENTION

This invention relates to abrasion-resistant coatings and specifically to easily scratched substrates with an abrasion-resistant coating deposited thereon.

For many purposes synthetic polymers have been developed to take the roles traditionally filled by very durable materials such as glass and metal. In many ways the replacements are superior but frequently they have the drawback that they suffer far too readily from abrasion damage. For this reason much work has been done on making the polymers harder and tougher.

There is however, an alternative approach that in some situations is preferred. This comprises the deposition of an abrasion-resistant coating on the polymer surface. The present invention falls into this latter category.

One such application which is becoming of increasing significance is in the field of optical laminates, that is transparent sheets comprising at least two layers of different materials. For the sake of clarity and brevity, this application is described in terms of that end use. It is obvious however that the coating compositions described herein can be used on other than laminates and on shaped articles such as lenses, bottles, etc. All such uses are to be understood as being within the reasonable purview of this invention.

In certain applications notably in car windshields, optical laminates comprising a thermoplastic sheet material between two sheets of glass are installed as standard equipment in many countries to comply with legislated safety standards. Such laminates have excellent strength and resistance to impact but do tend to be thicker and heavier than is desirable for this application especially when car weights are being cut to improve gas mileage. Moreover, the impact of an object on the surface of the inboard, that is the passenger side, surface of the windshield which is sufficient to splinter the glass layer is usually followed by a sliding downward movement along the fragments of splintered glass. Where the object making the impact is a human head, the resultant lacerations can be extremely unpleasant. It has, therefore, been proposed that the inboard glass layer be replaced by a lighter, thinner thermoplastic material that will not splinter to produce sharp cutting edges on impact.

Suitable replacement materials for the inboard glass that have been proposed include polycarbonate, polyethylene terephthalate, polyurethanes, cellulose acetobutyrate, acrylates and styrene/acrylonitrile copolymers. Unfortunately all of the suitable polymers so far described are much inferior to glass from the point of view of abrasion resistance so that in use the inboard surface is easily damaged by casual contact and even, in some cases, in normal cleaning operations.

One solution to this problem is to provide the inboard layer of thermoplastic material with an abrasion-resistant coating. This is a subject that, in its broadest form, i.e., the provision of coatings for easily scratched thermoplastic materials has exercised inventive minds since the mid-1940s.

DISCUSSION OF THE PRIOR ART

U.S. Pat. No. 2,404,357 describes an abrasion-resistant coating for polymethylmethacrylate comprising hydrolyzed ethyl silicate with a partially hydrolyzed vinyl acetate polymer in a proportion of 1 part by weight of the hydrolyzed polymer to 1-99 parts by weight of ethyl silicate calculated as $SiO_2$. Another patent describing a polymer coated with a resin-modified polysilicic acid in similar but less restricted terms is U.S. Pat. No. 2,404,426 which was derived from the same parent application as was U.S. Pat. No. 2,404,357. U.S. Pat. No. 2,440,711 describes a two-layer coating comprising a first layer comprising hydrolyzed ethyl silicate and a polyvinyl butyral resin and a second layer comprising a hydrolyzed ethyl silicate and a 20-90 percent hyrolyzed vinyl acetate polymer. More recently, U.S. Pat. No. 3,652,379 describes a polycarbonate resin article with a three-layer abrasion-resistant coating comprising a first layer of a hydroxylated polycarbonate resin, a second layer consisting essentially of silica and polyvinyl butyral and a third layer consisting essentially of silica and polyvinyl alcohol.

In U.S. Pat. No. 2,440,711 referred to above, it is specifically required that a low-hydroxyl polyvinyl butyral in the lower layer of this coating be used. It is stated that while relatively high hydroxyl polyvinyl butyrals such as those having up to about 28 percent of the polyvinyl alcohol groups unreacted with butyraldehyde, are useful in the base coat, they are not so desirable as the low hydroxy resins such as those having less than about 10 percent of the polyvinyl alcohol groups unreacted because of the higher curing temperatures required to insure the resultant layer is not soluble in the second layer laid on top of it and because of the difficulty of preparing adherent compositions with a high hydroxyl content.

It is noted that in U.S. Pat. No. 3,998,991 where a single coating similar to the second layer used in U.S. Pat. No. 2,440,711 is described, a new ingredient in the form of a trimethoxy silane derivative is added to improve flexibility and adhesion to the polymeric substrate.

U.S. Pat. No. 3,476,827 describes a coating composition comprising polysilicic acid, an organic polymer which can be partially hydrolyzed polyvinyl acetal (a 20 percent hydroxylated polymer is described) and a block copolymer of a lower alkylene oxide with dimethyl siloxane.

The present invention provides an improved coating composition that has shown a greatly improved resistance to abrasion over the coatings of the prior art when applied to a substrate.

DESCRIPTION OF THE DRAWING

FIG. 1 is a graph showing the variation of haze with the number of cycles on a Taber Abraser for six different materials, one of which is the coating composition of the invention.

DESCRIPTION OF THE INVENTION

This invention comprises a coating composition suitable for application to a substrate which coating composition comprises a polyvinyl acetal resin and a polysilicic acid in which the ratio by weight of polysilicic acid, calculated as $SiO_2$, to resin is from 2.0 to 4.0:1 and in which the resin is one which comprises from 35 to 50 percent by weight of hydroxyl groups calculated as polyvinyl alcohol.

While not wishing to be bound by any theoretical explanation herein set forth, it is believed that when the polyvinyl butyral is mixed with the polysilicic acid and heated to eliminate water, a reaction occurs between the acid and the hydroxyl groups in the polyvinyl butyral forming a reaction product with great coherence and an abrasion resistance approaching that of silica alone.

However, it has been found that although increasing the number of hydroxyl groups appears to lead to increased bonding between the resin and the acid, if the number is too great it is difficult to get adequate bonding between the composition and the thermoplastic resin substrate to which it is applied. In addition, above about 50 percent hydroxyl groups in the polyvinyl butyral, the resin becomes very difficult to handle because of its affinity for both organic and aqueous solvents. The range 35–50 percent and preferably 35–45 percent hydroxyl groups (calculated as polyvinyl alcohol) specifies an easily handled coating with unexpectedly improved abrasion resistance that can be satisfactorily bonded to a substrate.

THE POLYVINYL ACETAL

The polyvinyl acetal is conventionally prepared by hydrolyzing a polyvinyl acetate to form a polyvinyl alcohol and then reacting the polyvinyl alcohol with a suitable aldehyde to form a polyvinyl acetal. These reactions may be performed sequentially or simultaneously and be carried out in water or in a suitable organic solvent. However, in the absence of particularly stringent precautions neither reaction goes to completion so that a commercial polyvinyl butyral, for example, may contain up to 3 percent by weight of residual acetate groups, calculated as polyvinyl acetate, and from about 12 to about 25 percent and most often around 20 percent by weight of hydroxyl groups, calculated as polyvinyl alcohol. The present invention describes the invention in the context of such a preparative method but the polyvinyl acetals used may be obtained by any other convenient process such as controlled hydrolysis of the acetal. References to a percent hydroxyl content in what follows is to be understood as referring to a weight percentage of hydroxyl groups, calculated as polyvinyl alcohol, that is present in the polyvinyl acetal.

Any convenient aldehyde such as formaldehyde, propionaldehyde, hexaldehyde, can be used to form the polyvinyl acetal but in practice the preferred aldehyde is butyraldehyde and so the most preferred acetal is polyvinyl butyral.

In general, the polyvinyl butyral resins most frequently employed have Staudinger molecular weights ranging from about 30,000 to 600,000 and preferably from 150,000 to 270,000. The polyvinyl butyral resin preferably contains, on a weight basis, from 35 to 50 percent hydroxyl groups, calculated as polyvinyl alcohol and from 0 to 3 percent of acetate groups, calculated as polyvinyl acetate, the balance being substantially butyraldehyde acetal.

In contrast to the disclosures in the prior art, the present invention shows that, if the polyvinyl acetal resin has between 35 to 50 percent of hydroxyl groups and if the resin is combined with the polysilicic acid in the specified proportions, not only is the coating composition capable of easy application to a thermoplastic resin substrate but the adhesion obtained is excellent and the resultant coated thermoplastic resin surface is tough and has an outstanding resistance to abrasion damage.

The preferred amount of polyvinyl acetal used in the composition of the present invention is in the ratio of one part by weight for each 2.5 to 3.5 parts by weight of polysilicic acid, calculated as $SiO_2$. This is found to be the range that combines greatest adhesion to the substrate with greatest abrasion resistance of the coating formed thereon. Within this range however, from 2.5 to 3 parts of the polysilicic acid (calculated as above) for every part of the polyvinyl acetal resin is especially preferred.

THE POLYSILICIC ACID

The polysilicic acid is conventionally provided by hydrolyzed tetraethyl orthosilicate. In theory, silicic acid comprises molecules formed of silicon atoms surrounded by four hydroxyl radicals but in practice there is invariably a degree of combination or condensation to form a macro-molecule referred to as polysilicic acid. When heated, more condensation occurs with the elimination of water to give a three dimensional silica structure with the majority of the silicon atoms bonded through oxygen atoms to four other silicon atoms. The degree of condensation that occurs can vary widely and for this reason it is convenient to calculate the amount of polysilicic acid on the basis of silica or $SiO_2$. It is understood that no matter what the original organic esterifying group may be, the hydrolysis product is the same.

As was indicated above, it is believed that when the polysilicic acid reacts with the hydroxyl-containing polyvinyl acetal resin in forming a coating on a substrate, the hydroxyl group of the resin reacts with the acid to eliminate water and form a plurality of bonds between resin and acid yielding a coating having a hard coherent structure.

When applied to a substrate, the coating composition of the present invention is conventionally in the form of a solution in a water-miscible, water/organic solvent mixture. The organic solvent is conveniently an alcohol, particularly methanol, ethanol, propanol, n-butanol or hexanol, though other water-miscible solvents which are not affected by or react with the acidic ingredients such as acetic acid, cyclohexanone or tetrahydrofuran could be used.

After application, the composition is usually air dried before being cured by heating at a temperature sufficient to drive off the water eliminated during the condensation reaction.

Adequately cured coatings can be achieved by heating at temperatures from about 90° C. and upward with the upper limit depending on the heat stability of the substrate. In general, however, higher cure temperatures are more effective in optimizing the properties of the coating compositions of the invention.

In practice, in the absence of cure accelerators, there is an inverse relationship between cure time and the cure temperature. Thus it is found that 30 minutes at 150° C. produces an adequate cure, whereas if the temperature is 90° C., the cure time required is at least 2400 minutes. In practical terms, cure temperatures of from 120° to 175° C. and especially about 150° C. are preferred and the cure times that are preferred are from 15 to 60 minutes and particularly from 30 to 45 minutes.

The use of cure accelerators such as strong organic acids can however reduce the cure temperature needed to achieve comparably high performance coatings.

The coating compositions of the invention can be applied to a wide range of substrates such as glass, wood, melamine/F, P/F resins, U/F resins, polyvinyl chloride, though it is usually most advantageous to apply it to surfaces, especially synthetic polymer surfaces, which are easily scratched. Examples of such polymeric surfaces include polyvinyl butyral, polyurethanes, polycarbonates, polyethylene terephthalate, acrylonitrile copolymers, styrene copolymers, polymethylmethyacrylate and cellulose aceto-butyrate. However, when using high cure temperatures, some of the above polymeric substrates may not be suitable for the deposition of coatings of the highest quality available by the practice of the present invention.

The coating composition of the invention finds its most useful application in the provision of abrasion-resistant coatings for glazing units such as for example car windows and glazing panels for architectural use. It can, however, be applied in other fields such as the coating of molded objects such as thermoplastic bottles, lenses, trays and other receptacles that are subject to a certain amount of abrasive contact in use.

The coating composition is conveniently laid down in the form of a wet film from 0.025 mm to 0.5 mm and preferably from 0.04 mm to 0.16 mm in thickness though coatings of greater or lesser thicknesss be appropriate for certain applications. The dry layer thickness can be from 1 to 50 microns or even more though coatings of from 2.5 to 20 and especially 5 to 10 microns are most preferred in practice. Higher ratios of polyvinyl acetal to silica within the permitted ranges favor the production of thicker coatings.

SPECIFIC EMBODIMENTS

Specific examples of coating compositions of this invention and the utility of such coatings in providing abrasion-resistance to a variety of substrates are set out below. Comparison of the compositions of the invention with those of the prior art are also included.

It should be noted that the preparation of optical laminates using coating compositions comprising a hydroxyl-containing polyvinyl butyral is a process that is highly sensitive to the atmospheric dust and water vapor content at the time of preparation. Thus, unless the samples are produced under the same atmospheric conditions, the results obtained are not necessarily comparable.

Where examples compare the coating compositions according to the invention with those containing polyvinyl butyrals outside the scope of the invention, it may be assumed that they were produced under comparable conditions.

EXAMPLES 1-4

In these examples four samples of polyvinyl butyral with varying percentages of hydroxyl groups are prepared. In each instance the sample is characterized by its "percentage hydroxyl" calculated, as previously explained, on the basis of polyvinyl alcohol content of the resin.

EXAMPLE 1

A three-liter reactor containing 1500 ml of distilled water is placed on a steam bath and 100 grams of polyvinyl alcohol are dissolved therein over a period of about one hour. The solution is left to cool overnight. Next day it is heated to 50° C. on the steam bath and 49.2 grams of butyraldehyde are added with vigorous agitation. An additional 250 ml of water are added to assist in the mixing. When addition of the butyraldehyde is complete, 102 ml of 1N sulfuric acid is added in three equal amounts at about 15-minute intervals.

A resin is precipitated and this is neutralized using potassium hydroxide, washed and dried and then dissolved in 1500 ml of denatured ethyl alcohol. The hydroxyl content is found to be 43.6 percent.

EXAMPLE 2

Example 1 is repeated except that 40 grams of butyraldehyde are used. The hydroxyl content is found to be 57.3 percent.

EXAMPLE 3

Example 1 is repeated except that 65.6 grams of butyraldehyde are used. The hydroxyl content is found to be 36.4 percent.

EXAMPLE 4

Example 3 is repeated with the difference that the butyraldehyde is added to an ice-cold polyvinyl alcohol solution. The hydroxyl content of the product is determined to be 39.6 percent.

EXAMPLE 5

This Example demonstrates the manner in which the coating compositions of the invention may be prepared. A first solution comprising 15 percent by weight of silica was prepared by adding 117.2 grams of 0.1N hydrochloric acid to 3.62 grams of 95 percent ethanol and shaking the mixture for two minutes before slowly adding thereto 520 grams of 99 percent tetraethylorthosilicate. The mixture was shaken for two minutes and then immersed in a cold water bath and subjected to occasional agitation for 60 minutes. This first solution was allowed to age for 8 days at room temperature. It had a pH of 1.5.

A second solution containing 5 percent by weight of a polyvinyl butyral having a hydroxyl content, calculated as polyvinyl alcohol, of between 35 and 50 percent by weight was prepared by mixing 50 grams of n-butanol and 7 grams of water for two minutes then slowly adding thereto 3 grams of the polyvinyl butyral while agitating the mixture and heating at the boiling temperature of the butanol. The heating and mixing were continued until the polyvinyl butyral had dissolved.

Equal weights of the first and second solutions were then mixed together for 15 minutes to produce the final coating composition of the invention. This same general process was used with minor variations to prepare the compositions according to the invention tested in subsequent Examples.

The use of water in the polyvinyl butyral solution was found to be a desirable procedure to reduce the viscosity of the solution to a more manageable level. Other solvents besides n-butanol can be used such as ethanol, cyclohexanone and glacial acetic acid. In general however the coatings prepared by using a solution of the polyvinyl butyral in n-butanol are preferred.

EXAMPLES 6-7

These examples compare the abrasion resistance of coatings prepared using polyvinyl butyrals with varying hydroxyl content.

In Example 6 the polyvinyl butyral is the product obtained in Example 1. In Example 7, the polyvinyl butyral is a commercial polyvinyl butyral resin having a hydroxyl content of 21.0 percent.

Each polyvinyl butyral is blended with hydrolyzed ethyl silicate in two ratios of silicate (calculated as $SiO_2$) to resin of 3.5:1 and 2.5:1.

The resulting coating composition is, in each case, applied to a polyethylene terephthalate optical grade film and cured at 150° C. for 45 minutes. Samples are prepared in which the film is applied using a coating blade with a gap set at 0.08 mm. In each case four samples are produced and tested for abrasion resistance on a Taber Abraser according to the procedure set forth in U.S. Standard Z26-1 (1966) Test No. 17, Method 5-17 except that haze is calculated using a spectrophotometer both before abrasion and after 300 cycles on the Abraser. The method of calculating haze is essentially that described in the above U.S. Standard Z26-1.

In the Tables that follow the following abbreviations are used:

$\overline{X}i$ average initial haze
$\overline{X}f$ average final haze (after 300 cycles)
dX average haze change
SDi standard deviation (initial haze)
SDf standard deviation (final haze)
dSD standard deviation (haze change)

TABLE I

| RATIO | HAZE (Standard Deviation) | EXAMPLE 6 43.6% OH | EXAMPLE 7 21.1% OH |
|---|---|---|---|
| 3.5:1 | $\overline{X}i$ (SDi) | 1.20 (0.05) | 1.20 (0.19) |
|  | $\overline{X}f$ (SDf) | 2.48 (0.20) | 4.43 (0.56) |
|  | dX (dSD) | 1.28 (0.22) | 3.23 (0.45) |
| 2.5:1 | $\overline{X}i$ (SDi) | 1.14 (0.10) | 1.34 (0.29) |
|  | $\overline{X}f$ (SDf) | 2.73 (0.42) | 3.26 (0.99) |
|  | dX (dSD) | 1.60 (0.56) | 1.92 (0.89) |

From the results in the above Table I it can be seen that the results obtained in Example 7 are substantially worse than those for Example 6. This is especially true at the 3.5:1 ratio ($SiO_2$ to resin), where the change in haze (dX=3.23) is more than double that shown in Example 6, (dX=1.60).

EXAMPLES 8-9

The polyvinyl butyral prepared in Example 1 (43.6 percent OH) and the commercial polyvinyl butyral used in Example 7 (21 percent OH) are used to produce coating compositions having a ratio of $SiO_2$:polymer of 3:1.

The formulations are deposited on optical grade polyethylene terephthalate film using a coating blade gap setting of 0.08 mm and are cured at 150° C. for 45 minutes.

Eight samples of coated film are prepared for each formulation and these samples are tested for abrasion resistance in the manner described in Examples 6 and 7. The results obtained are set forth in Table II.

TABLE II

|  | EXAMPLE 8 (21% - OH) | EXAMPLE 9 (43.6% -OH) |
|---|---|---|
| $\overline{X}i$ | 1.08 | 0.77 |
| Highest | 1.486 | 0.914 |
| Lowest | .914 | 0.511 |
| $\overline{X}f$ | 2.90 | 1.77 |
| Highest | 3.543 | 2.057 |
| Lowest | 2.286 | 1.486 |
| dX | 1.82 | 1.00 |
| Highest | 2.17 | 1.49 |
| Lowest | 0.91 | 0.59 |

It is clear that the amount of haze generated by the test in the coating composition according to the invention (Example 9) is very much less than that obtained using a coating composition of the prior art.

EXAMPLES 10-11

In these examples the products tested in Examples 8 and 9 are tested for yellowness which is a measure of the deviation from total clarity or freedom from color of the samples used in these examples. Yellowness is generally developed as a result of thermal degradation of the polymer during the curing process. Hence, low yellowness indicates a product that is very stable under cure conditions.

Yellowness is calculated as a percentage figure using the formula:

$$\% \text{ Yellow} = \frac{100 (T_{640} T_B)}{T_{560}}$$

where T is the transmission (measured using a spectrophotometer) at the light frequency indicated by the subscript and $T_B$ is calculated as follows:

$T_B = 0.01 T_{400} + 0.11 T_{420} + 0.36 T_{440} + 0.35 T_{460} + 0.17 T_{480}$

A higher figure for the percentage yellowness indicates a worse performance.

Example 10 (43.6% -OH)—Average yellowness 4.83
Example 11 (21% -OH)—Average yellowness 5.80

EXAMPLES 12-13

Samples of coated sheets produced for Examples 8 and 9 were exposed to 95% R.H. for 81 days at room temperature to establish the sensitivity of the coating to moisture. Eight samples of each material (21% hydroxyl and 43.6% hydroxyl) were removed, conditioned 24 hours at 50 percent relative humidity and given 300 cycles on the Taber Abraser under the conditions set forth in Examples 8 and 9 above.

The samples were then dried over $P_2O_5$ to remove moisture from the polyvinyl butyral interlayer (which becomes opaque due to moisture pick up) until the samples appeared transparent. Then the initial haze which could not be obtained before testing was read adjacent to abraded area. The data obtained are set forth in Table III below.

TABLE III

|  | 43.6% Hydroxyl | 21.0% Hydroxyl |
|---|---|---|
| $\overline{X}i$ | 1.80 | 11.46 |
| $\overline{X}f$ | 4.91 | 15.77 |
| dX | 3.11 | 4.31 |

Because of the high initial haze on the 21.0 percent hydroxyl samples, the moisture level was checked to insure both samples were dry. The 43.6 percent hydroxyl samples contained 1.29 percent by weight of water and the 21.0 percent hydroxyl sample contained 0.82 percent by weight of water.

Thus, the coating composition of the invention has maintained its abrasion resisting properties better than the composition containing 21.0 percent hydroxyl.

EXAMPLE 14

This example compares the long term abrasion resistance of the coating compositions of the present invention with a number of other samples with different surface coatings. Sample A which is included for the sake of comparison, is a glass/polyvinyl butyral/glass commercial laminate. Sample B has a surface layer formed from a composition believed to comprise a fluorocarbon-containing copolymer and polysilicic acid and available from duPont coated upon a polymethyl methacrylate under the trade name Lucite AR. Sample C is a coated polycarbonate sheet available under the trade name Lexan MR4000 from General Electric Company. Sample D is polycarbonate sheet coated with a commercial abrasion-resistant composition believed to comprise a methyl siloxane available from DeGussa A.G. under the trade name Gebovit. Sample E is a glass/polyurethane laminate (abrasion tested on the polyurethane face).

The coating composition of the invention used in Example 14 (Sample X) is obtained by blending the 43.6 percent hydroxyl polyvinyl butyral obtained in Example 1 with hydrolyzed ethyl silicate in proportions to give an $SiO_2$: resin ratio of 2.5:1. This is deposited on optical grade polyethylene terephthalate using a coating blade with a 0.152 mm setting and cured at 150° C. for 45 minutes.

All samples are tested on the Taber Abraser in the manner described in Examples 6 and 7. The results are shown in the graph presented as FIG. 1, in which percent haze is plotted against the number of cycles on the Taber Abraser. Samples C, D. and E broke down after the point on the graph where the line terminates. As can be seen from the chart, when tested on the Abraser, the abrasion resistance of the coating composition of the invention is superior to that of any of the other coatings and is somewhat comparable to that of glass itself (Sample A).

It can be seen, therefore, that even under very extreme conditions it is possible to obtain an abrasion-resistant coating that will demonstrate only acceptable haze development.

EXAMPLES 15-16

Three polyvinyl butyral resins were prepared, each having a different percentage of hydroxyl groups (measured as polyvinyl alcohol) in the polymer. Each resin was blended with hydrolyzed ethyl silicate in a ratio of silicate (calculated as $SiO_2$) to resin of 2-5:1.

The resulting compositions were applied to sheets of optical grade polyethylene terephthalate using a coating blade gap set at 0.08 mm and cured at 150° C. for 30 minutes to form a hard coherent coating. The samples were then subjected to 100 cycles on the Taber Abraser using the procedure set forth above in the U.S. Standard Z26-1 referred to above. The results obtained are set forth in Table IV. Each value is the average of the results obtained on sixteen different samples.

TABLE IV

|  | PERCENT HYDROXYL[1] | H[2] |
| --- | --- | --- |
| Comparative | 18.5 | 3.41 |
| Example 15 | 38.7 | 1.71 |
| Example 16 | 47.6 | 1.58 |

[1] Percent Hydroxyl (measured as PVOH)
[2] H Change in haze after 100 cycles on the Taber Abraser These examples show the great improvement obtained using 'high-hydroxyl' (i.e., >35 percent PVOH) polyvinyl butyral resins as opposed to the typical 'low-hydroxyl' (i.e., <35 percent PVOH) polyvinyl butyrals which are commercially available.

The present invention also contemplates the use of conventional additives in the coating composition of the invention. These include adhesion promoters, flow control agents, dyes, U.V. stabilizers, pigments, antioxidants and the like. It is evident from the foregoing that many changes and modifications can be made without departing from the essential spirit and scope of the present invention.

What is claimed is:

1. A coating composition which comprises a polyvinyl acetal resin and polysilicic acid in which the ratio by weight of polysilicic acid, calculated as $SiO_2$, to resin is from 2.0 to 4.0:1 and in which the resin is one which comprises from 35 to 50 percent by weight of hydroxyl groups, calculated as polyvinyl alcohol.

2. A coating composition according to claim 1 in which the polyvinyl acetal is polyvinyl butyral comprising from 35 to 45 percent by weight of hydroxyl groups calculated as polyvinyl alcohol.

3. A coating composition according to claim 1 in which the ratio of polysilicic acid, calculated as $SiO_2$, to polyvinyl acetal resin is from 2.5 to 3.5:1.

4. A coating composition comprising polyvinyl butyral and polysilicic acid in a ratio by weight of polysilicic acid, calculated as $SiO_2$, to resin of from 2.5:1 to 3.5:1 in which the polyvinyl butyral comprises from 35 to 50 percent by weight hydroxyl groups, calculated as polyvinyl alcohol.

* * * * *